United States Patent
Gregorek et al.

(10) Patent No.: US 12,254,481 B2
(45) Date of Patent: *Mar. 18, 2025

(54) SYSTEM AND METHOD FOR MANAGING INVENTORY AND DISTRIBUTION OF HOTEL ROOMS BY MULTIPLE BROKERS USING AN ONLINE INTERFACE

(71) Applicants: Mark Gregorek, Mahwah, NJ (US); Alexandra Gregorek, Mahwah, NJ (US)

(72) Inventors: Mark Gregorek, Mahwah, NJ (US); Alexandra Gregorek, Mahwah, NJ (US)

( * ) Notice: Subject to any disclaimer, the term of this patent is extended or adjusted under 35 U.S.C. 154(b) by 450 days.

This patent is subject to a terminal disclaimer.

(21) Appl. No.: 17/886,331

(22) Filed: Aug. 11, 2022

(65) Prior Publication Data
US 2023/0084599 A1 Mar. 16, 2023

Related U.S. Application Data

(63) Continuation of application No. 16/051,856, filed on Aug. 1, 2018, now Pat. No. 11,562,387.

(51) Int. Cl.
| | | |
|---|---|---|
| *G06Q 10/00* | (2023.01) | |
| *G06Q 10/02* | (2012.01) | |
| *G06Q 30/0201* | (2023.01) | |
| *G06Q 30/08* | (2012.01) | |
| *G06Q 50/12* | (2012.01) | |

(52) U.S. Cl.
CPC ......... *G06Q 30/0206* (2013.01); *G06Q 10/02* (2013.01); *G06Q 30/08* (2013.01); *G06Q 50/12* (2013.01)

(58) Field of Classification Search
None
See application file for complete search history.

(56) References Cited

PUBLICATIONS

"Stuck With a Pricey Hotel Reservation? Maybe You Can Sell It" NY Times: Itineraries, May 17, 2016 (Year: 2016).*

* cited by examiner

*Primary Examiner* — Hafiz A Kassim
*Assistant Examiner* — Scott M Ross
(74) *Attorney, Agent, or Firm* — Olivo IP Law Group, P.C.; John W. Olivo, Jr.

(57) ABSTRACT

An e-commerce based transaction system on a network connected via the Internet to multiple remote computers and mobile phones providing the distribution of hotel room lodging reservations or other lodging sites for location and date of specific events. A central database is hosted on a server and transmitted to individual remote servers or users that can have a respective database of listings from individual brokers oration or other system participants. In the alternative, the blockchain can be a mode of information dissemination. E-commerce transactions are conducted by the system, which performs a number of transaction-related functions, such as posting available hotel room reservations or lodging site reservations for sale, and purchasing spaces for use, resale, brokerage or pure speculation online. The system and methodology accommodate location-based events where hotel rooms are listed by brokers or hotel operators or owners and sold to individual system users and marketed reflective of and in advance of specific time and location sensitive events.

12 Claims, 13 Drawing Sheets

SYSTEM AND METHOD FOR MANAGING INVENTORY AND DISTRIBUTION OF HOTEL ROOMS BY MULTIPLE BROKERS USING AN ONLINE INTERFACE

PRIORITY CLAIMS

This application is a continuation of U.S. patent application Ser. No. 16/051,856, filed Aug. 1, 2018, which is incorporated herein.

BACKGROUND OF THE INVENTION

Literally thousands of diverse, lucrative investment options exist outside of the stock market, currency trading, cattle and corn futures, collectables and memorabilia, and so on, if you are willing to research, understand, and go after them. As with all investments regardless of size, it always comes down to the inevitable trade-off between risk and reward, and the endless search to turn that maxim on its head by maximizing the reward while conversely reducing the risk, which until now was a financial paradox.

The process of booking a hotel room reservation or lodging site reservation (e.g., Airbnb) for a future date based upon when a particular popular event will occur in any global location, or the speculation of hotel accommodations, follows the present market conditions of supply and demand. For example, the Super Bowl generates hotel room or other lodging scarcity annually, and solar eclipses generate a path stretching thousands of miles long, and over 50 miles wide of hotels and lodging in sold-out conditions because of their paths.

Online e-commerce is enabling and empowering people to monetize an underutilized asset as never before, by the likes of Uber and Lyft for transportation, Airbnb for a rarely used spare room, and eBay for a surplus of goods, are all examples of e-commerce based income generation for individuals. In most cases, democratized platforms allow for users and purveyors (e.g., Uber drivers) to participate. By having a democratized platform, Uber enables its users to enjoy a ride or profit from being a driver, through the use of an automobile often owned by the driver.

More importantly, what we see coming again is the emergence of products and services being offered, that are directly tied into the phenomenon driving Airbnb, Uber, Lyft, and eBay. Businesses such as the recently launched financial service called "loftium.com", which makes "down payment" loans to people shopping for homes, by having the homeowner promise to set one room aside for use as an Airbnb room, and paying the lender a percentage of that rental income.

Loftium's technology predicts how much revenue an Airbnb will generate in the neighborhoods where a customer is house hunting. Using that data, Loftium's team determines how much down-payment assistance each customer is eligible for, thereby having ownership in ten separate rental incomes. A Loftium type secondary company could not exist without the primary Airbnb, or how an eBay gave birth to PayPal, or in this case, an expedia.com or any of the other Online Travel Agents ("OTA") giving birth to the likes of a roomspeculator.com and an entirely new Industry created around hotel room reservations.

There are always going to be those that will take this opportunity to load up on as many positions as possible. Speculating on lodging scarcity could be done by an entity set up for that purpose to aggregate as many reservations as possible, much like the ticket scalper, and what if every lodging site within the path of a several thousand mile long, and 70 miles wide solar eclipse was "online" and available for speculation years in advance? Then and only then will the Hotel owner operator know the true value of their property, the hotel room and the true cost of a reservation. Indeed, the location and time and exact locations of the Total Solar event (a moving path over a land, or sea, mass) is so well known forever in advance, that its appearance is carved in Galactic Granite, so that speculators, agents (or even simply would be viewers) could plan well in advance to take part and invest in the event opportunity as either a purveyor, speculator, viewer, reseller, Agent, or any combination thereof.

Based on 4 years of subpoenaed data (NYAG 2010-'14) over 100 Airbnb users had 10 or more properties. So at least in New York City prior to recent legislation, major, million-dollar real estate businesses use Airbnb. It's possible that these apartments are pieces of larger real estate empires. But this data suggests that mostly small-scale investors use Airbnb, not real estate companies. Not at all democratized such as with Uber, likely because real estate carries with it a certain responsibility for securing a designated spot of land.

With approximately 137,000 hotels in the US, there are approximately 5,000,000 rooms available each night in locales with countless attractions, entertainment and sporting events flourishing throughout the year in just about every city in every state, and that's just in the US. Multiply those numbers by about five and this will give you some idea of the International opportunities. Long-term reservations have such high cancelation rates that hotels find themselves rushing around at the last minute to fill the gaps left by canceled bookings, which logically leads to price reductions, which in turn results in more people re-booking reservations, causing a vicious circle of cancelling and rebooking of reservations. What does not exist is a true "real time" exchange (like a commodities exchange) value of hotel rooms and lodging sites, independent of ownership or management, across all brands and modes of land control, from Airbnb to hotels to trailer parks and so on. Until now, and because of our system that can track and verify the true value of a given room, on a given day in a specific location. What does exist is an arbitrary room value, calculated and set in place based on the same arbitrary values used before, that are calculated months in advance, and booked on flawed data as to what the hotel owner operator "thinks" the room is worth. This information is then processed by the OTA's in their race to sell the room as quickly and for as cheaply as possible, having never let the "real-time" market dictate what the room's value is at its most valuable moment in time. What is proposed is a system that allows for the true value of a room's worth to be tracked, calibrated and compiled so the Hotel owner operator can better track his true margins and operating costs, proving to be as beneficial to the Hotel owner operator as Uber is to the world's ride-sharing public.

In 2015, a few of the major hotels began to extend the minimum notice of cancellation for guests to avoid fees. Some went from 6 p.m. on day of arrival to 24 hours or as much as "14 days notice required". Prior to that, hotels such as Marriott International, Hilton Worldwide and InterContinental Hotels Group, among others, adopted a strategy to offer nonrefundable room rates at a lower price point.

According to a recent Travel Weekly report, hoteliers have since found that offering the discounted, nonrefundable rates to guests that book earlier in the booking window is moving the needle much more than increased cancellation fees. The article cites the New York Marriott Marquis, which was offering prepaid, nonrefundable rooms for late-September weekend dates at about a 15% discount when the story published. One wrinkle in hotels requiring travelers to pay in advance for a nonrefundable rate is that it takes away an advantage that hoteliers had over OTAs (Online Travel Agencies), which are not often able to offer hotel rooms with favorable cancellation policies attached to them.

Lastly, the existing high percentage of reserved room cancellations will obfuscate to a considerable degree any additional room reservation increases our speculators are adding to the mix, thereby shielding us and the real-time information we have at our disposal from hotels really knowing the true value of the service we are providing for an unknown period of time, at which point the "buzz" sets in along with reality. It is a well-known fact that people often double or triple book hotels in or near a Super Bowl, either close by, an intermediate range away or even further away, for no discernible reason other than knowing that reservations "don't cost anything". The industry and the consumers end up both suffer ng in the end through higher hotel prices and being forced to endure less than optimal lodging situations, which is exactly one of the ills our system cures. The speculators book the rooms, list them on our site, and parcel them off a few at a time, maximizing the value of each, that which is then shared with the Hotel owner operator, who was not bothered or inconvenienced in any way during these transactions.

SUMMARY OF THE INVENTION

The present invention is a system and method for providing the controlled distribution and listing access for purchased hotel room reservations and lodging reservation sites, either for personal use, resale, brokerage, collection or speculation. Room or lodging site reservation inventory is created by way of an event lodging generator, which either accepts hotel room or lodging site reservation inventory from owners or operators or tenants with the right to sublet, or may generate inventory, based on events in the future with a specific date and geographic site(s) certain for occurrence. In one embodiment, transactions are facilitated through a central database that is hosted on an exchange server and transmitted to individual remote servers that can have a respective database of listing reservations from individual brokers or Hotel owner operators, or some other type of third party aggregator. This network-based system allows a broker, or "speculator" or agent to list pre-purchased, or some other restrictive caveat or reservation reserved hotel room reservation, on a database, whereby one or more recipients, or system "users" or visitors, are able to then purchase the reservation of that hotel room from the speculator.

According to the present invention, it is recognized that lodging sites, hotel rooms and the like, are overwhelmingly fungible. No truly democratized online resource exists for buying and selling, trading and brokering, and otherwise, an asset subject to speculation. The present invention helps the travel industry by providing for all fees and pricing, advertising fees and even data transfer fees. The present invention, for the first time, provides the travel industry with a way to obtain metrics, cross-brand and even cross-method for providing lodging from hotel spaces to Airbnb, in response to the recognition that certain future events will draw crowds. Indeed, said crowds may even include those associated with a solar eclipse.

The present invention is a flexible software platform that encompasses a variety of features, including but not limited to: property management software; vendor partnerships; guest communications; marketplace connectivity; reporting tools; cancellations; a brokerage portal for speculators, buyers, agents, hotel owner/operators; a communications hub; staff management; payment processing, commission tracking and payment; channel management; and reservation bookings. Furthermore, at every point, any entity or person with a right to a hotel or lodging site may "change roles", so that the potential occupant for a coveted hotel room reservation may decide "I would rather offer my right for resale", thus becoming a Speculator, or "I want to hold this and sell if a desired price is reached", a speculator who's heart is in the event, not in the money, and if not offered enough, deciding to "stay as planned".

According to the present invention, a form of variable geo-fencing may be used to provide that hotel rooms or lodging sites within bands of proximity to an event, and may reflect varying rate bands, so that the closer an asset is to an event, the more its pricing will be increased, taking into account supply and demand. However, it is not a requirement of the present invention that closer necessarily means more expensive, as an object of the present invention is true democratization so that system users or participants establish pricing based on demand and other relevant asset distributor, owner or operator parameters or incentives.

One embodiment of the present invention is a countdown alert that is sent to the online visitor, to alert them that time to purchase the hotel room reservation is running out. This alert can also be delivered to notify the speculator as well as the agent, to notify them of the time remaining on the reservation listing.

The present invention is also capable of expansion to incorporate other travel related services, including but not limited to: sightseeing tours; car rentals, leases and sales; yacht rentals, leases and sales; private airline bookings, leases and sales; restaurant reservations; local travel guides; specialty retailers; and points of interest within a specific geographical area. Additionally, we have reserved the capability of adding other tangible assets beyond real estate, hotels and properties in general, by readying a platform to address speculations on jewelry, art, precious stones and rare earth metals, etc., to name a few of the many possibilities before us.

By way of a reservation example, let's assume a potential hotel room user or even a speculator "A", on Jan. 5, 2018 books a room in a Ski Lodge in Vermont in November for Spring Break, April 2019 at $200 per night, for Friday & Saturday, check-out Sunday. On or about Jan. 5, 2019, Party "A" then lists the room on a site according to the present invention for an amount more than what it was booked for, and for less than what it is currently being offered for at surrounding hotels since Speculator "A" is in a sold out hotel at the base of the Ski Lift, as long as that current offering amount is greater than the original booking amount. In this event, Party "A" started out as the room User and is now a Speculator and can also list the room with a sliding scale so as the deadline to cancel approaches, the reservation amount can be reduced daily until either flipped or cancelled or the Speculator decides to use the room. Four months later in May or June of that year, the lodge is booked and the closest hotel to the lifts is 30 miles away at $400 per night. But the Hotel owner operator has no "moral" way to make Speculator "A" pay closer to the true value of the room, without some severe public blowback. Of course, during Spring Break, snow is not a certainty, and so room prices can collapse at any moment. With the present invention, the hotel prices are dynamic in real time, and the sellers and buyers are totally democratized, so that a room reservation at a hotel may be procured via many sources and not a simple website or toll-free phone number as is often the case.

If flipped, the buyer (Party "B", a buyer) pays the agreed upon room rate (in this case $300), plus an X (X %) percent Processing & Handling fee, and is then provided with a reservation number that matches the original $200 registration. The Hotel/Lodge is paid in full for the stay, and after Party/Client "B" checks in, arrangements are made to pay Speculator "A" an amount equal to the difference he originally booked the room for, less a XX (XX %) percent Processing & Handling fee. Of course, according the present invention, any number of financial arrangements may be made.

As the program grows and develops, ancillary amenities such as Concert, Sport, Theater Tickets, Restaurant reservations, Pre-paid Tours and Excursions, Private Aviation, etc., might also become an additional revenue stream connected to a given room reservation as a bonus or additional incentive to move room reservation inventory.

According the present invention, it is recognized that certain events occur which cause a temporary lodging site or hotel room shortage in a given area within a certain range of dates. For example, the Super Bowl creates a severe shortage of lodging shortage within a large geographic region. Also, solar eclipses occur rarely and cause a severe shortage of lodging sites and hotel rooms, over a wide-ranging geographic region, stretching thousands of miles long and over 50 miles wide, in the path of this amazing and rare event. According to the present invention, the path of the solar eclipse can be mapped decades in advance across the globe, and speculators may offer to buy up all the inventory in the path of the event. Who is a speculator? Who is an Agent? That process may be democratized, similar to Uber, so that any person or entity may become a speculator or Agent of a lodging, hotel, camp ground, etc. Any person or entity may decide to "reserve" or "buy up" if called for, as much inventory as desired in the path of the event, from hotel rooms to Airbnb sites to even parking lots upon which motor homes may rest or campgrounds. Agents and speculators are locals with knowledge that approach a given hotel and introduce them to participate in our system, and in return receive a commission. Speculators are the ones that know which hotels sell out and book a reservation in said hotel and receive a much bigger reward when the room reservation is sold. When the Agent realizes how much more money the Speculator made for the same amount of risk, the Agent becomes a Speculator. In short, the original owners of the lodging sites and hotel rooms are always made whole if they want to remain as they were and get their standard rate out of the gate. But, being made whole is actually being denied, knowing the true value of their property. Once the speculators set the secondary market, there will be winners and losers, much like Stub Hub operates for tickets to controlled events. Except in the Stub Hub example, it's not truly democratized, as Stub Hub is merely a broker who wins on brokerage fees only. According to the present invention, any party can be a broker, speculator or agent as the inventory for spaces is offered by so many diverse and unrelated parties. For example, for a solar eclipse, thousands of lodging sites may exist per square unit of measurement, versus tickets to a sporting event are offered by just one event operator such as a sports franchise. Unlike our System, with Stub Hub you can only become a speculator if you own/possess the ticket, while anyone in our System can become a Speculator, an Agent, an advertiser or just a casual visitor.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE PREFERRED EMBODIMENT

Various embodiments are described for enabling an online hotel room reservation marketplace. Numerous specific details are set forth to provide a thorough understanding of the embodiments. The specific structural and functional details disclosed herein may be representative and do not necessarily limit the scope of the embodiments.

Figure 1:
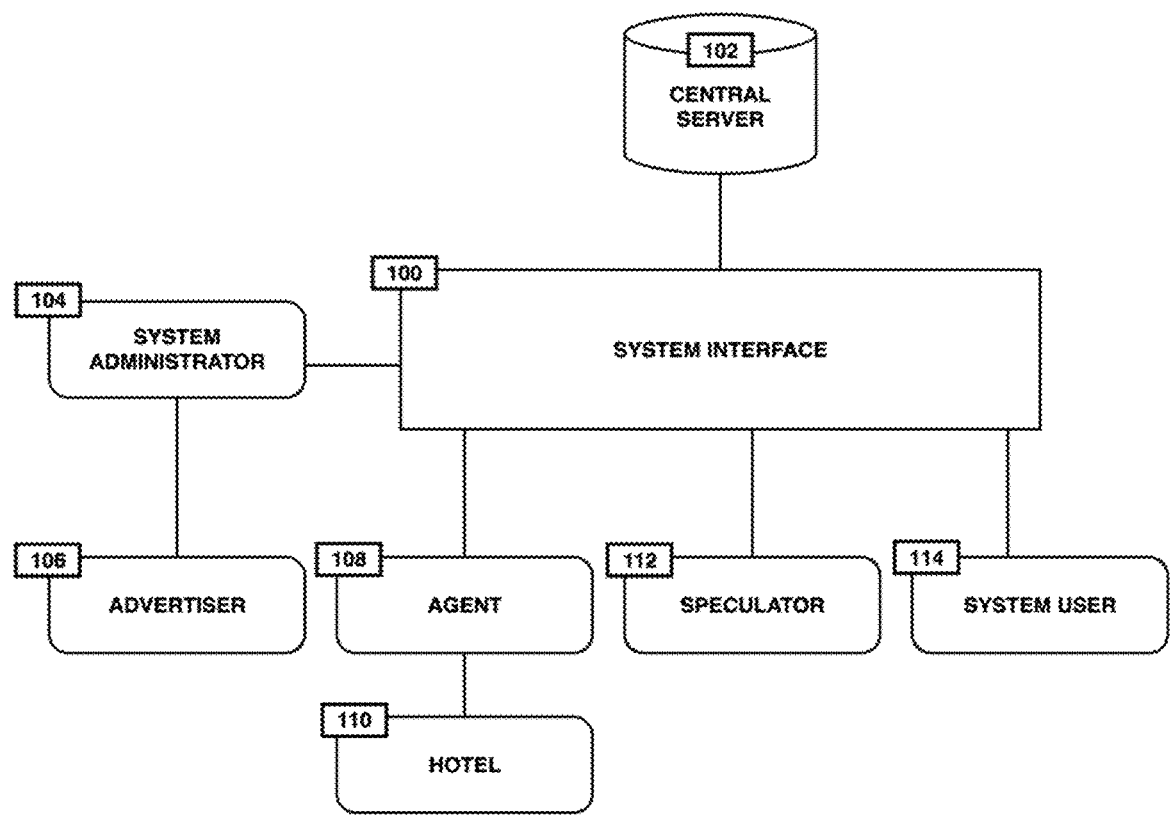
FIG. 1 is a block diagram overview of the system and components of the present invention.

FIG. 1 diagrams the overall system and components of the present invention. In accordance with the preferred embodiment of the present invention, the online system interface 100 is stored on a central server 102. The system interface 100 is monitored and controlled by the system administrator 104. The system administrator 104 communicates directly with system advertisers 106, whereby the system administrator 104 can integrate approved advertisements into the system interface 100. The system interface 100 consists of: agents 108; speculators 112; and individual users 114. An agent 108 is a type of system user that serves as the primary communication and listing content link between the system interface 100 and the hotel 110. A speculator 112 is a system user that functions as a listing poster and hotel room reservation broker. The speculator lists reservations on the system interface 100 available for purchase. The individual user 114 functions as the consumer and can use the interface 100 as a means of searching or browsing for listed hotel room reservations on order to purchase reservations posted by the speculator 112 or the agent 108.

Figure 2:
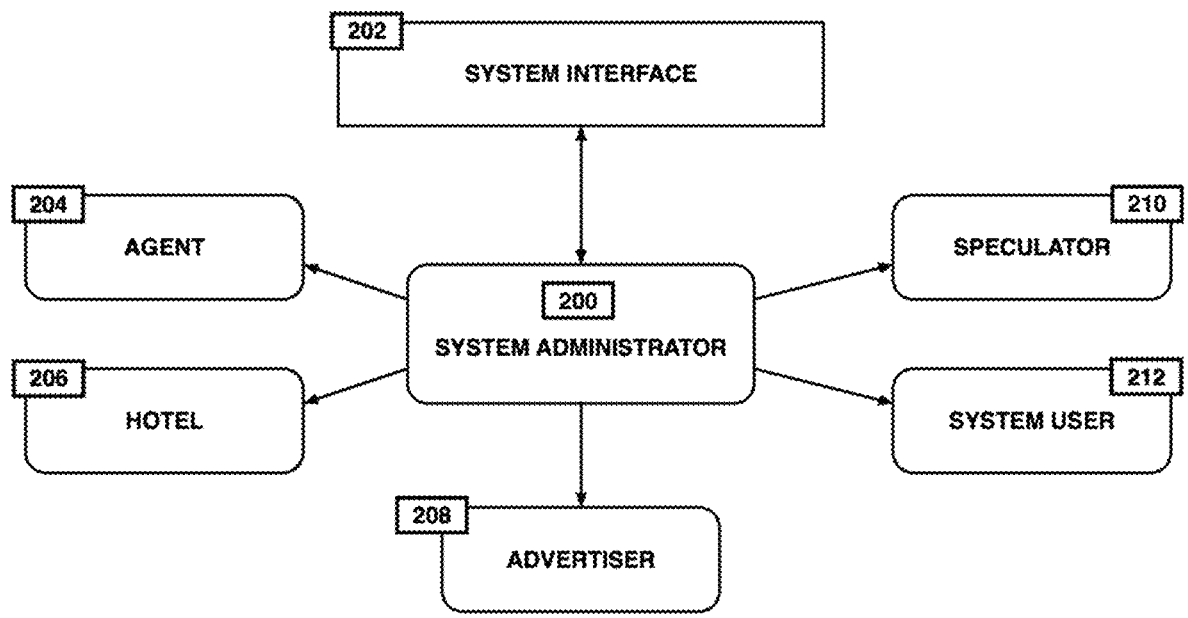
FIG. 2 is a block diagram of the control administrator component of the present invention.

FIG. 2 diagrams the control administrator component of the present invention. In accordance with the present invention, the administrator 200 communicates directly with the system interface 202 to monitor all interface content and control all content displayed within the interface 202. The administrator 200 also serves as the control moderator and is able to interface directly to: agents 204; hotels 206; advertisers 208; speculators 210; and individual users 212.

Figure 3:
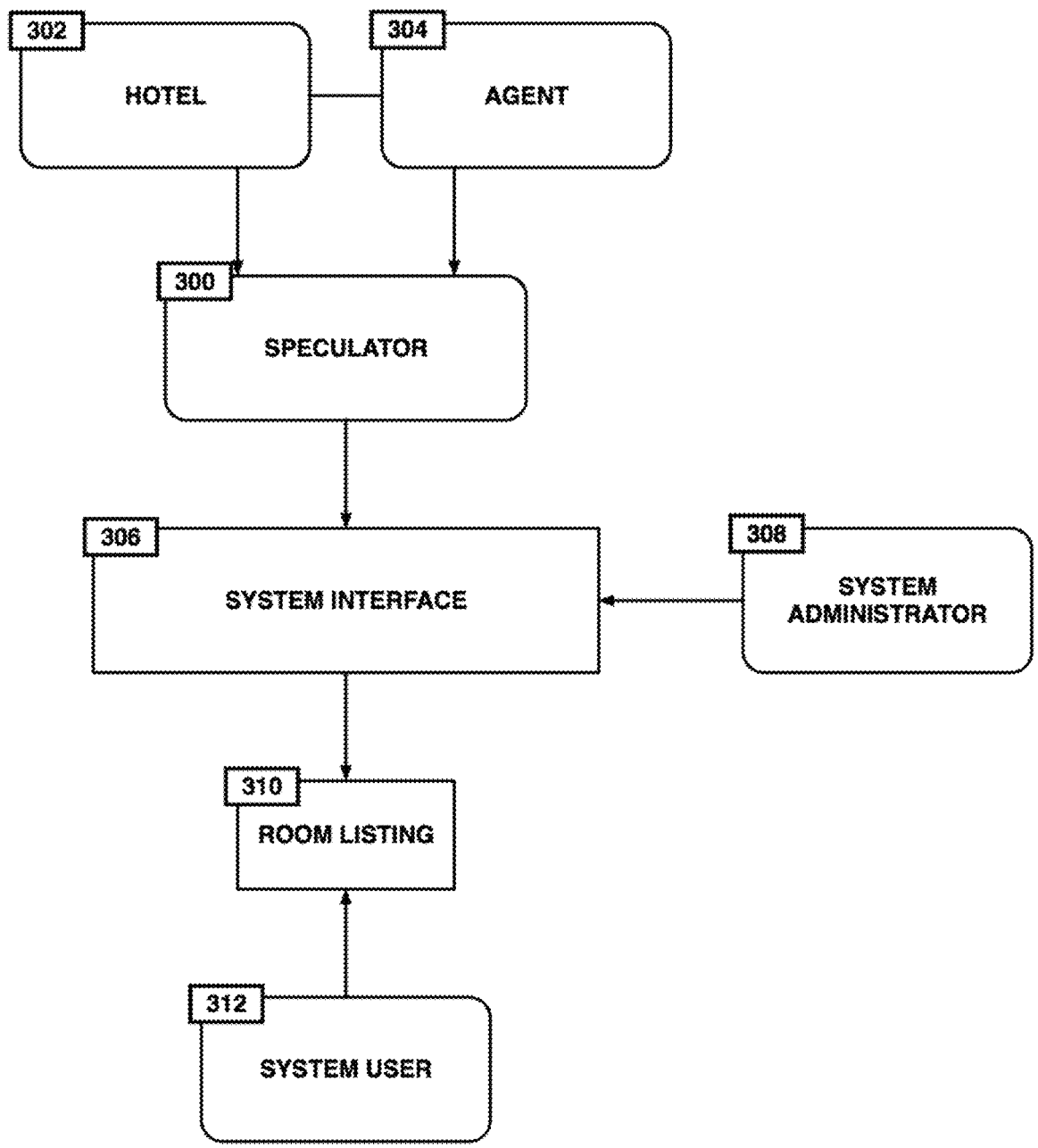
FIG. 3 is a block diagram of the speculator component of the present invention.

FIG. 3 diagrams the speculator component of the present invention. In accordance with the present invention, a speculator 300 is a system user that can broker hotel room reservations by posting the reservations already reserved by the speculator 300 to the system interface 306. The speculator 300 is also able to communicate directly with hotels 302 or with agents 304 that communicate on behalf of hotels 302. The speculator 300 lists a purchased reservation on the system interface 306 as a room listing 310. All listings are monitored and controlled within the system interface 306 by the system administrator 308. A room listing 310 can be viewed and then purchased by the individual system user 312.

Figure 4:
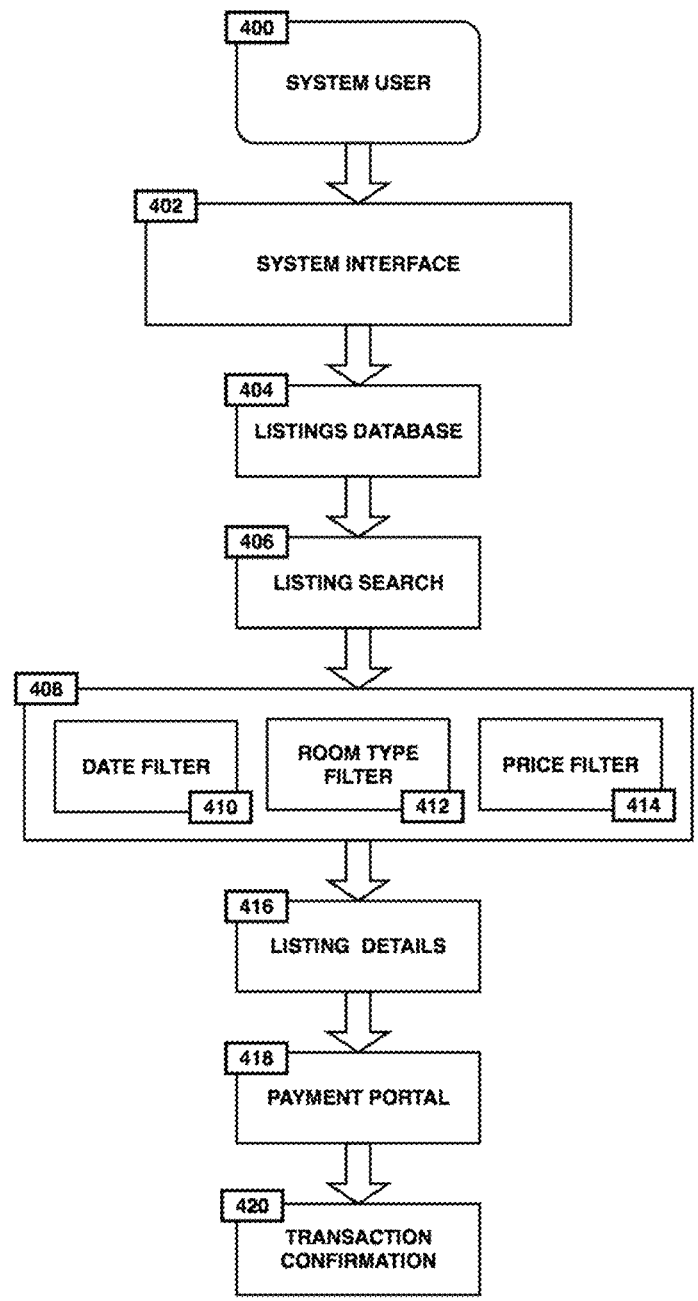
FIG. 4 is a block diagram of the system user component of the present invention.

FIG. 4 diagrams the individual system user component of the present invention. In accordance with the present invention, a system user 400 accesses the system interface 402 online through a web browser or a mobile smartphone device. The user 400 can then view the listings database 404 through the system interface 402. The user 400 can use the listing search function 406 in the database 404 to specify or filter 408 the listings to meet the requirements of the user 400. Listing search filters 408 can include but are not limited to: filtering listings by date 410; filtering listings by room type 412, for example the room size; and filtering listings by price 414. Once the filtering parameters 408 have narrowed the listing results, the user 400 is able to obtain the details 416 for each listing by selecting the specific listing. If the user 400 decides to purchase the room reservation, the user must complete the payment details on the payment portal 418. Once payment details have been securely verified and processed within the payment portal 418, the user 400 receives a transaction confirmation of the room reservation 420.

Figure 5:
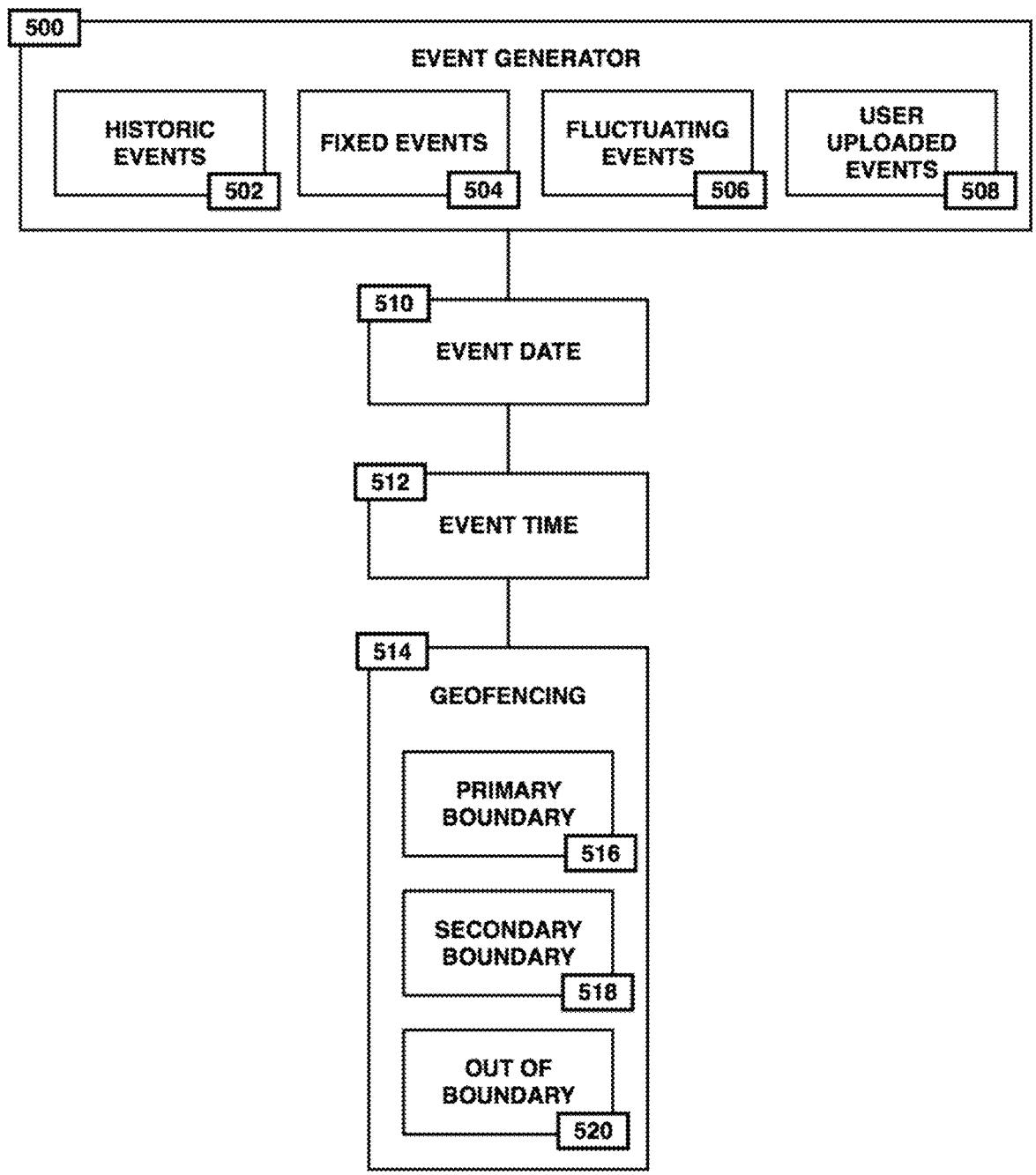
FIG. 5 is a diagram of the event generator component of the present invention.

FIG. 5 is a diagram of the event generator component of the present invention. In accordance with the preferred embodiment of the present invention, the Event Generator 500 is a component within the system interface that allows the system user to search listings by events. The Event Generator consists of: historic events 502 that have occurred previously; fixed events 504 that occur on a set date; fluctuating events 506 whereby the date and time can change; and user uploaded events 508 that have been uploaded by system users. Within the Event Generator 500, the user can also filter events by event date 510, and event time 512. The Event Generator 500 also allows for specifying the location through the use of geo-fencing 514. The user can view a map with a specific geo-fence perimeter, and view listings that are within the primary 516, or secondary boundary 518 of the fence perimeter, as well as listings that are located out of the geo-fence boundary 520.

Figure 6:
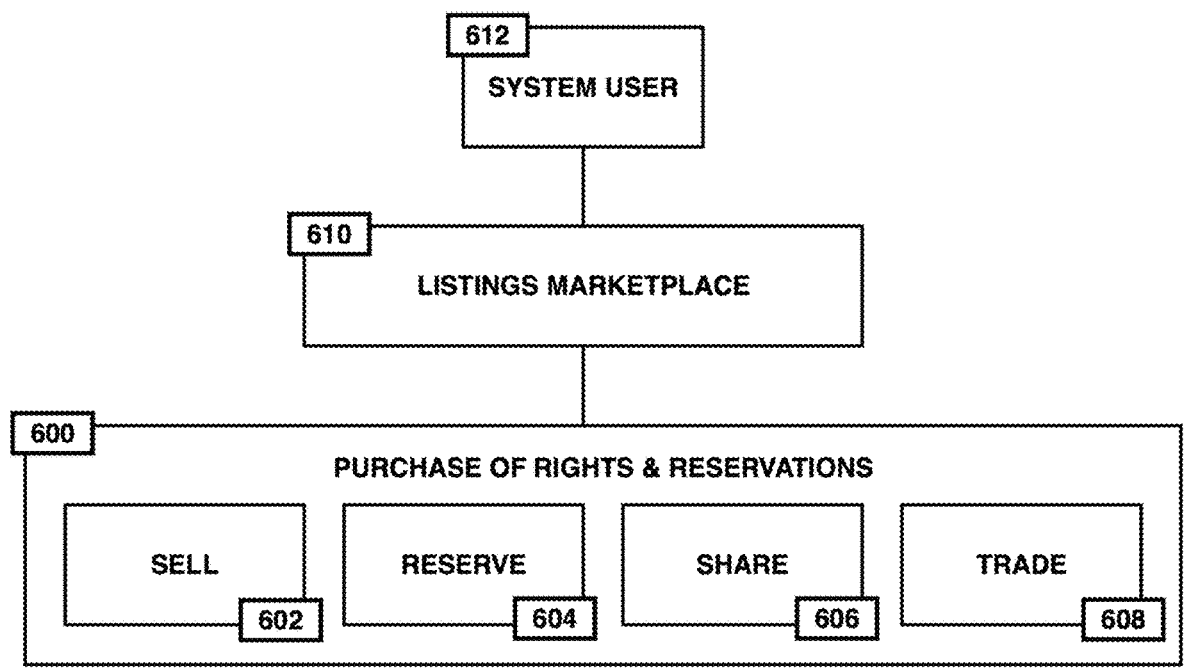
FIG. 6 is a diagram illustrating the allocation of event generation and rights within the listing marketplace of the present invention.

FIG. 6 is a diagram illustrating the allocation of event generation and rights within the listings marketplace of the present invention. In accordance with the preferred embodiment of the present invention, hotel room reservation listings function as the primary commodity in the listings marketplace. The system user 612 can view listings and select listings from within the listings marketplace 610 and select purchase options for the listings through the purchase of rights and reservations 600 portal. The system user has the ability to sell listings 602; reserve listings 604; share 606 the listing rights and reservations; and trade 608 the listing rights and reservations with other users for their listing rights and reservations.

Figure 7:
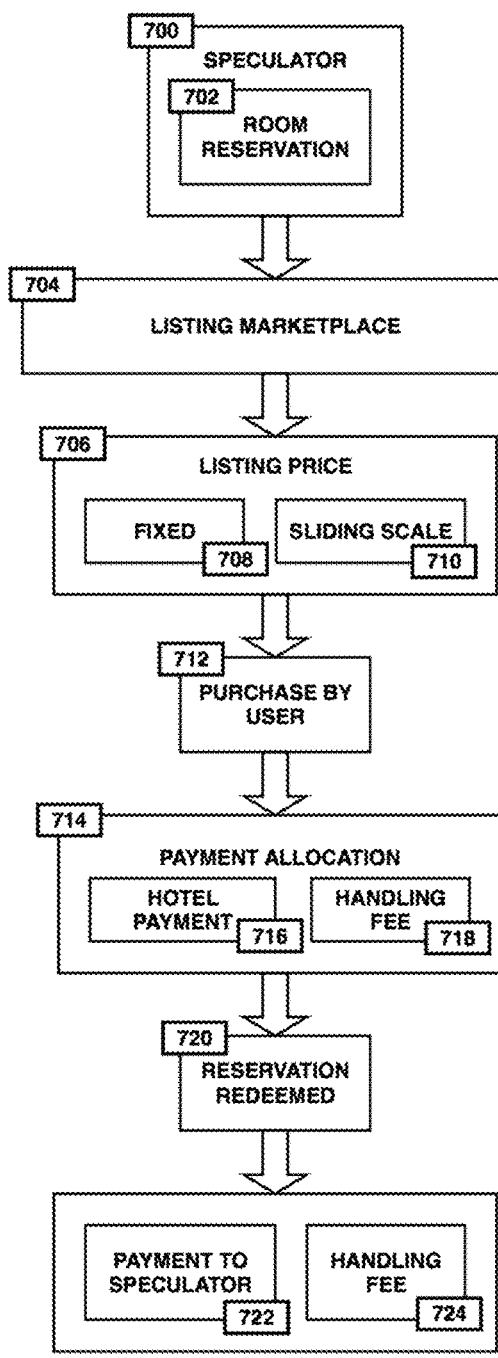
FIG. 7 is a diagram of the purchase process and revenue sharing component of the present invention.

FIG. 7 is a diagram of the purchase process and revenue sharing component of the present invention. In accordance with the preferred embodiment of the present invention, the speculator 700 reserves a room at a hotel 702 and then posts that reservation on the listing marketplace 704. The listing price 706 will be set for an amount greater than the original reservation amount, and the speculator has the option to select a fixed price 708 or set the price at a sliding scale 710, whereby the listing price gradually decreases as the reservation date approaches. Once the listing is purchased by a system user 712, payment is allocated 714 to the hotel 716 where the reservation was originally made as well as a handling fee 718, a percentage of the total listing price, paid to the system administrator. Once the reservation is redeemed 720 when the user checks in to the hotel, the remaining purchase price is paid to the speculator 722, minus a handling fee 724 percentage paid to the system administrator from the profit amount paid to the speculator.

Figure 8:
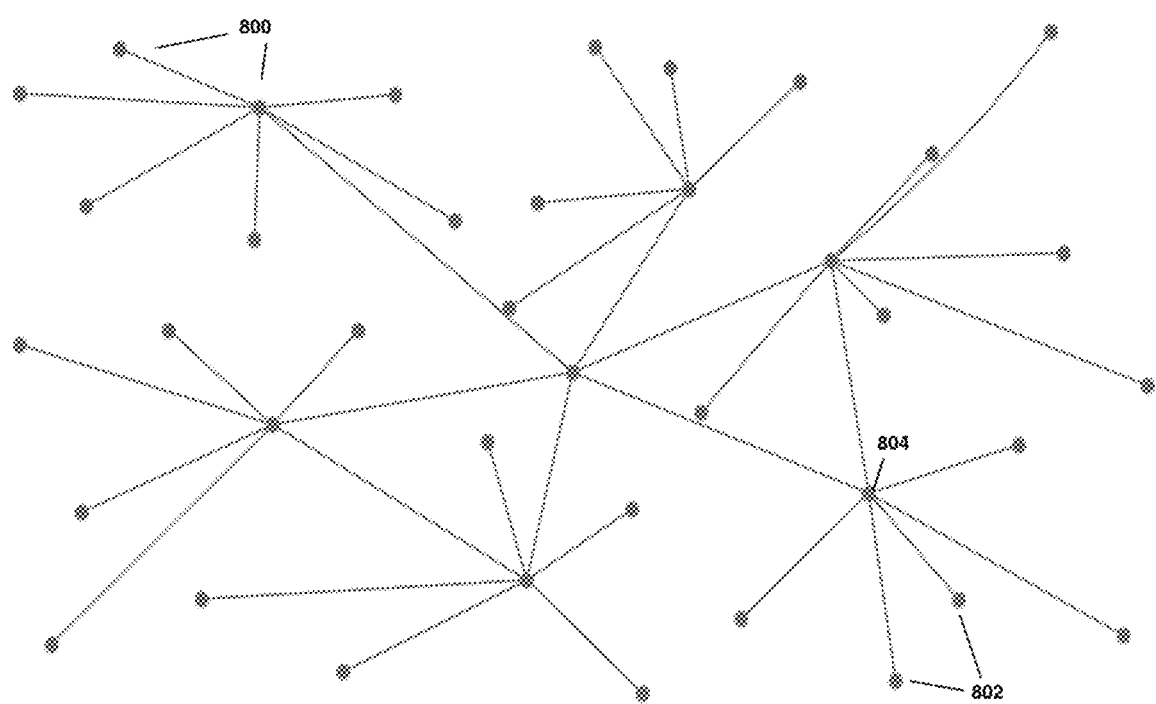
FIG. 8 is a line diagram illustrating a decentralized network.

FIG. 8 is a line diagram illustrating a decentralized network. In accordance with the preferred embodiment of the present invention, the specific architecture of the network can be either decentralized or distributed. FIG. 8 provides an illustrative diagram of the decentralized network. FIG. 8 depicts each node with a dot 800. Under this system, each node is connected to at least one other node 802. Only some nodes are connected to more than one node 804.

Figure 9:
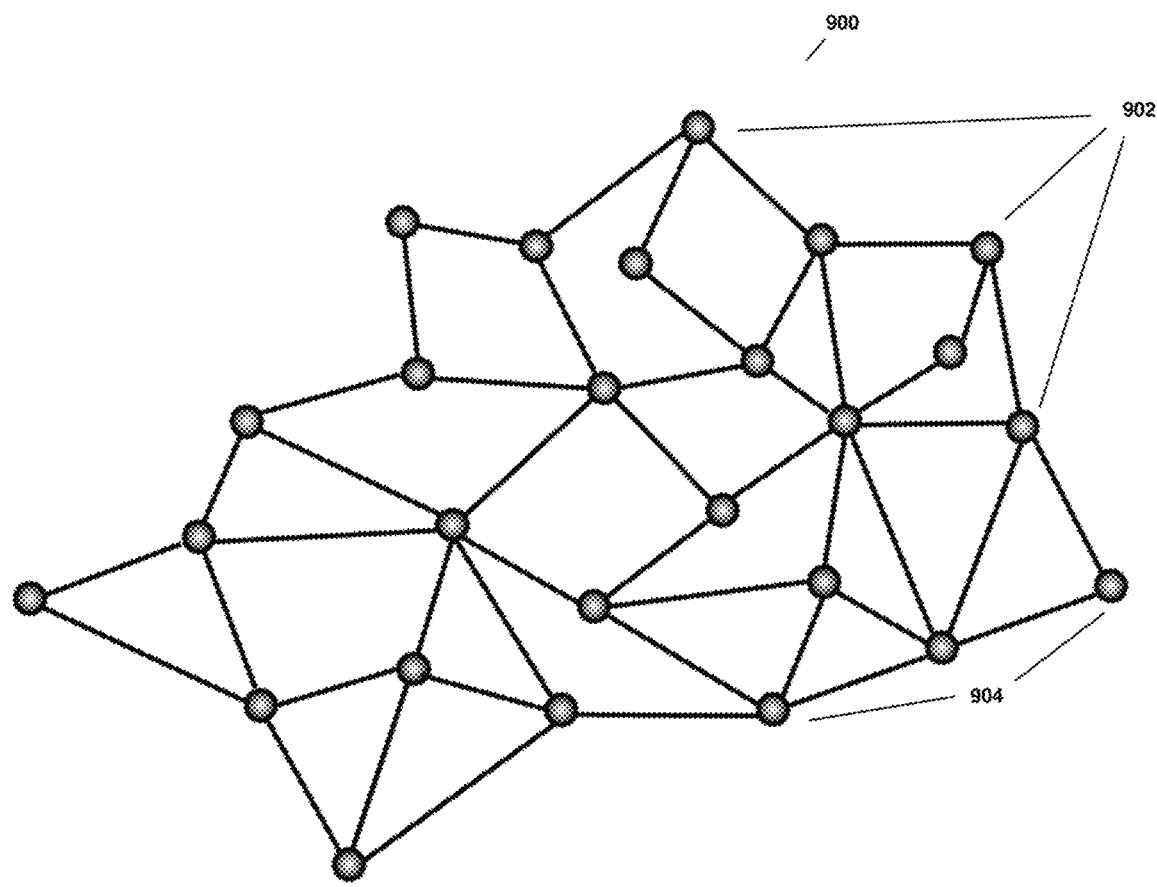
FIG. 9 is a line diagram illustrating a distributed network.

FIG. 9 is a line diagram illustrating a distributed network. In accordance with the preferred embodiment of the present invention, each node in the distributed network 900 is represented by a dot 902. Unlike a decentralized network, each node of a distributed network is directly connected to at least two other nodes 904. This makes it more difficult to attach a distributed network. The present invention can be deployed on a centralized, decentralized, or distributed network.

Figure 10:
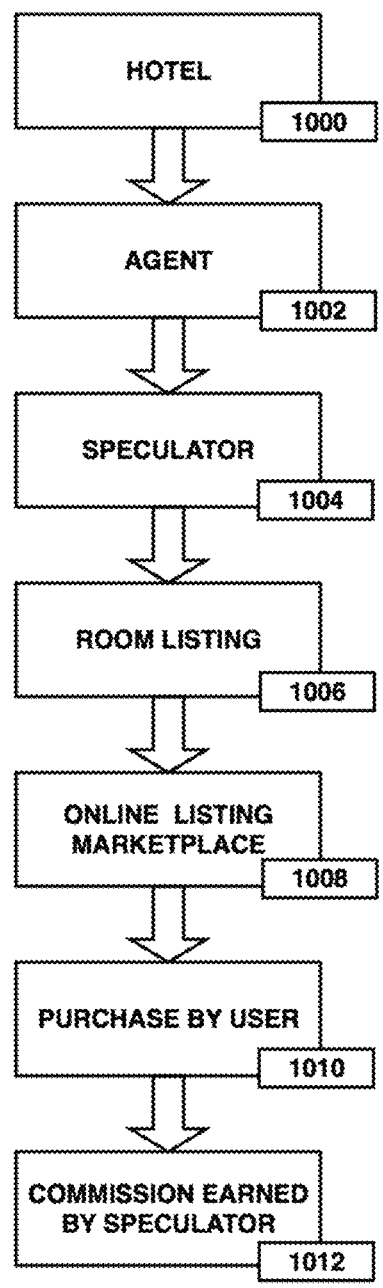
FIG. 10 is a diagram illustrating the connections between the users and system of the present invention.

FIG. 10 is a diagram illustrating the connections between the users and system of the present invention. In accordance with the preferred embodiment of the present invention, the agent 1002 signs up hotels 1000 to allow for the posting of sold out room listings 1006 on the online listing marketplace 1008. The agent 1002 contacts hotels 1000 by phone, email or in person and is paid a Ten (10%) percent commission on the fee amount that the speculator 1004 receives from the sale of the listing 1006, as well as 10% of any marketplace 1008 ads generated by the agent 1002. The agent's 1002 10% commission is calculated on the amount of fees received by the online marketplace 1008 from the purchase by user 1010. The speculator's 1004 80% commission is calculated on the amount the reservation is resold to the user 1010 and agrees to the 20% Processing & Handling fees. The hotel 1000, in return for allowing rooms to be re-sold on the listing marketplace 1008, receives 50% of the Processing & Handling Fees received by the marketplace 1008, less the 10% commission paid to the agent 1002.

Figure 11:
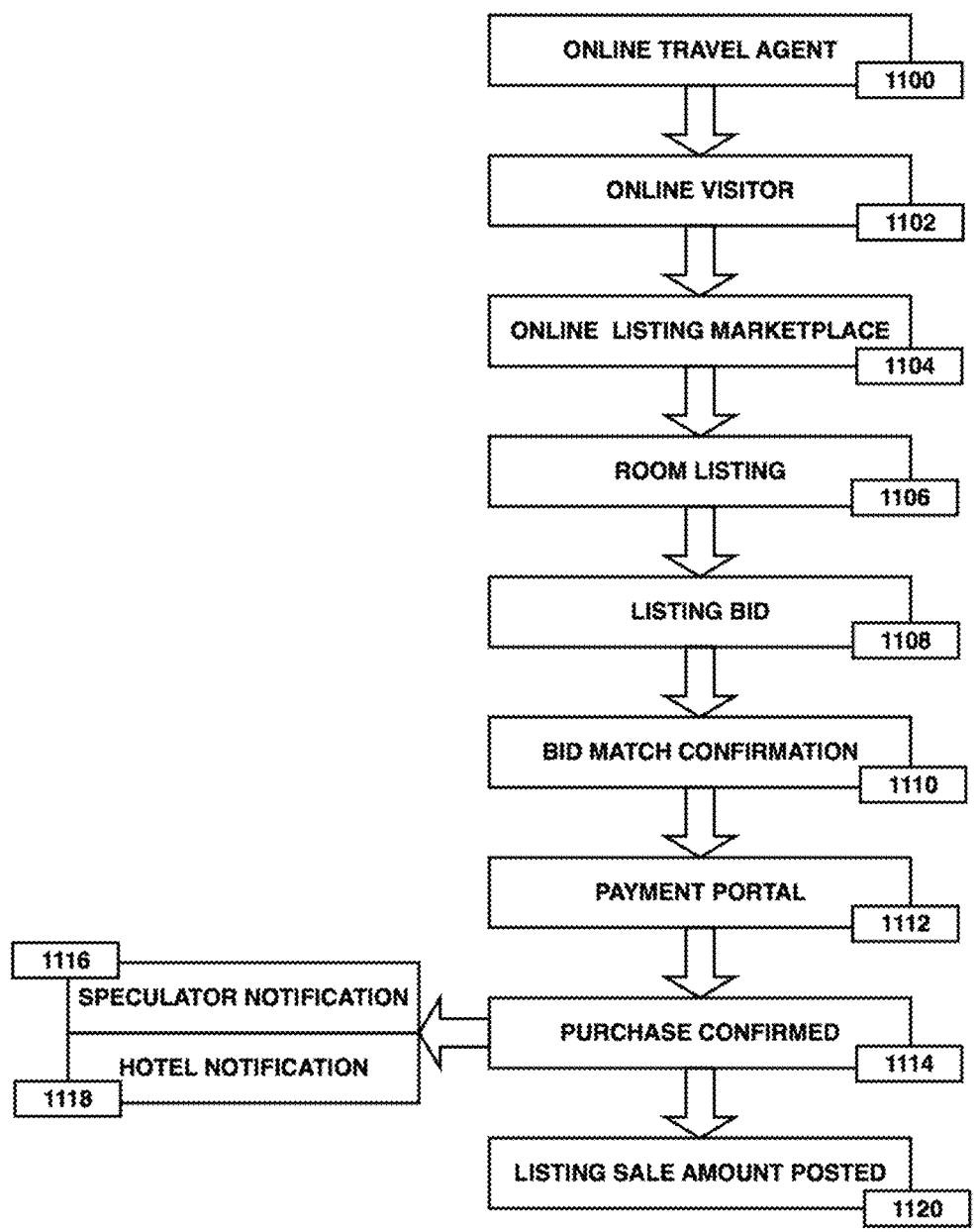
FIG. 11 is a flow diagram illustrating online visitor use of the present invention.

FIG. 11 is a flow diagram illustrating online visitor use of the present invention. In accordance with the preferred embodiment of the present invention, an online visitor 1102 is informed by an online travel agency 1100 that rooms for a specific date are booked. The online visitor 1102 contacts the hotel and is directed to the online listing marketplace 1104. The online visitor 1102 browses the marketplace 1104 and is able to filter the listings by criteria such as but not limited to: Event, Country, or Date. The online visitor 1102 selects the listing from filtered criteria and then makes a bid 1108 on specific listing reservation. If the bid matches the speculator's ask, the speculator is informed 1116 by the marketplace 1104 of sale, after the visitor 1102 provides payment details through the marketplace payment portal 1112. The system marketplace 1104 then notifies the hotel 1118 with the visitor's information and processes the visitor's 1102 payment for booking the listing, plus 10% Processing & Handling Fee. The marketplace instructs the speculator to pay the hotel in full for the original booking price, and once notified by the hotel of receipt of payment, the speculator is reimbursed payment less 20% processing and handling fee. The marketplace pays the hotel 50% of processing and handling fees paid by the room speculator, less 10% of amount of fees the marketplace received from the speculator on sale of the listing reservation. The listing marketplace then posts amount room was sold for 1120, which then becomes barometer for other similar speculator listed properties.

Figure 12:
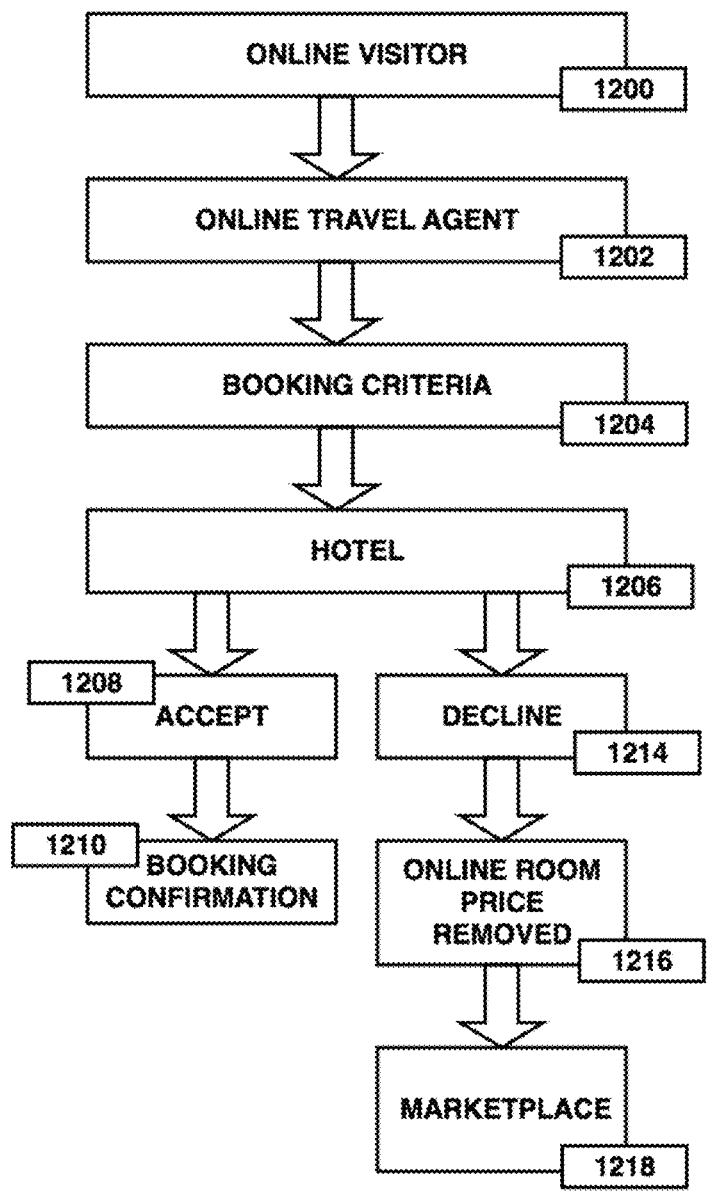
FIG. 12 is a flow diagram illustrating additional visitor use of the present invention.

FIG. 12 is a flow diagram illustrating additional visitor use of the present invention. In accordance with the preferred embodiment of the present invention, the online visitor 1200, contacts the online travel agency 1202 to research prices and to book reservation for specific date(s) at specific location. The visitor 1200 transmits to the travel agency 1202 specific information and criteria 1204 such as, but not limited to: room/bed preferences, number of people, children, health issues, credit card (cc) information, contact information, and identity data. The travel agency 1202 transmits to the Hotel 1208 specific information and criteria 1204 received from the visitor 1200. The agency 1202 transmits back to Hotel 1206 if room reservation is acceptable based on specific information and criteria 1204 it received. The hotel 1206 transmits acceptance 1208 of reservation or transmits not available if room already reserved 1214. If Hotel 1206 accepts reservation 1208, the travel agency 1202 transmits acceptance of reservation to the visitor 1200 and sends the visitor's personal information, credit card and contact credentials to Hotel 1206 along with an amount that can be charged to hold reservation if required 1210. If the hotel 1206 declines 1214, it transmits that information to the agency 1202 which then removes room price from website 1216 and transmits to the visitor 1200 that the room is already booked, and to contact hotel directly, whereby the visitor 1200 is redirected to the online listings marketplace 1218. Once a hotel becomes marketplace 1218 client, it is the responsibility of agent to ensure that the hotel has posted its direct contact information on its website and on that of travel agency websites, and that when a "booked" situation occurs, Hotel knows to automatically notify all reservation holders of the opportunity, and that if they wish to change or modify their existing reservation in exchange for an amount determined by them, to contact the system marketplace directly. This releases the hotel of any obligation as to the "Processing & Handling" fees, as well as to the distribution and amounts of said fees.

Figure 13:
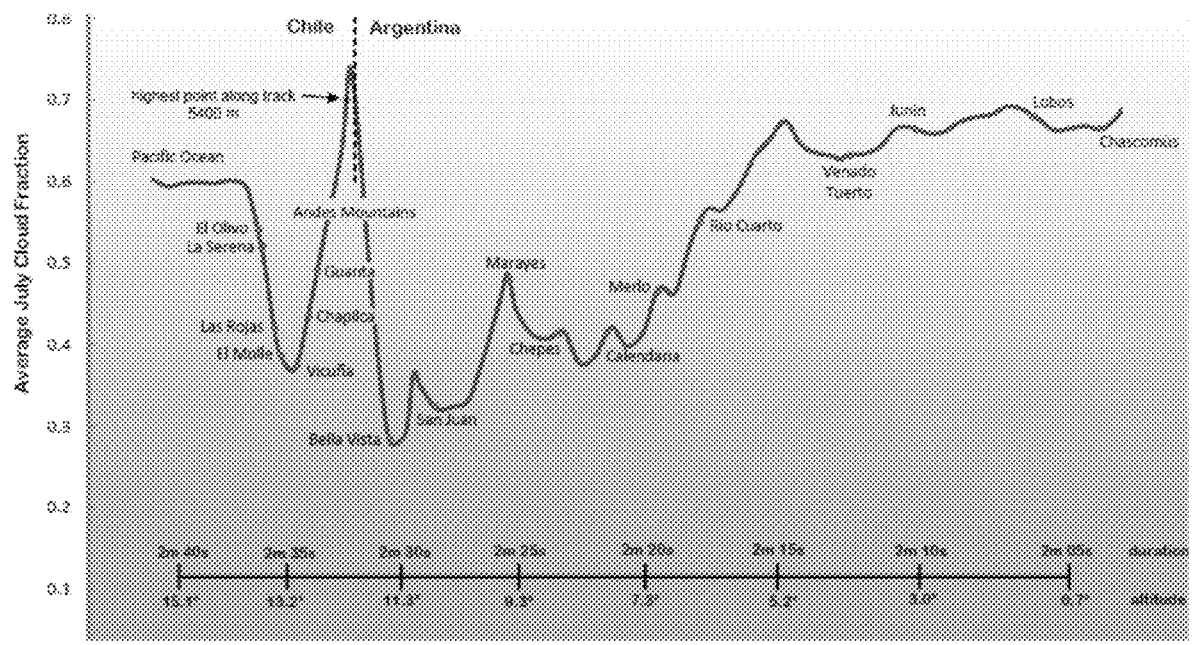
FIG. 13 is an example of analytical data used in the allocation of event generation and rights in accordance with the present invention.

FIG. 13 is an example of analytical data used in the allocation of event generation and rights in accordance with the present invention. The example illustrated in FIG. 8 is a graph pertaining to a list of cities that will be in the visible pathway for an upcoming eclipse event, comparing the average cloud fraction based on historical weather data along the Y axis. To the duration and altitude of each listed city along the X axis. This data is then used to determine the optimal location to view the event, and thereby generating the value of hotel rooms in each of the listed cities for the event based on market interest for that particular event.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A method for a user to make event reservations by using a tangible computer-readable storage medium having computer-executable instructions implemented by a computing system for formatting and storing event information indicative of pre-established crowd-drawing events wherein said event information is either provided by an external database or generated internally in response to pre-established crowd-drawing events, said method comprising:
    determining, at one or more remote servers, primary and/or secondary geo-fence perimeter bands corresponding to said pre-established crowd-drawing events;
    receiving, at said one or more remote servers, input from a speculator electronic device, wherein said input includes at least one offer of legally controlling a peak occupancy demand band corresponding with said geo-fence perimeter bands around said pre-established crowd-drawing events;
    generating, at said one or more remote servers, a legal contract generator which operates in response to said at least one offer of legally controlling a peak occupancy demand band;
    generating, at said one or more remote servers, a contract for occupancy by said legal contract generator, in which said contract is generated corresponding to said pre-established crowd-drawing events in response to acceptance by a lodging reservation supervisor;
    evaluating, at said one or more remote servers, potential pricing for speculator listed properties corresponding to said pre-established crowd-drawing events;
    wherein said user activates a browser associated with a first URL which is associated with said lodging reservation supervisor, and in turn, said user is redirected to a second URL associated with an online marketplace wherein said user is able to selectively filter marketplace listings by criteria such as but not limited to event, country, or date and wherein said user selects from said filtered criteria and then makes a bid on a specific listing reservation; and
    wherein said lodging reservation supervisor ascertains if a room reservation is acceptable based on specific information received, and if the reservation is acceptable and if availability exists, said lodging reservation supervisor transmits acceptance of said reservation, said user's payment and contact credentials are presented to said lodging reservation supervisor to hold said reservation, said acceptance of said reservation is transmitted to said user, and said user's personal information, credit card and contact credentials are transmitted to said lodging reservation supervisor who in turn processes said payment and removes available room prices from public websites enabling participation of said user in said event reservations.

2. The method of claim 1 wherein said tangible computer-readable storage medium is located remote from a newly created off-site inventory speculator storage device.

3. The method of claim 2 wherein said speculator storage device is a computer including a display for indicating to a speculator a status indicative of whether said legal contract has been accepted by said lodging reservation supervisor.

4. The method of claim 1 wherein said lodging reservation supervisor is associated with a traditional lodging site with its own traditional automated reservation system and wherein said traditional automated reservation system interfaces with said legal contract generator to remove from inventory availability of a lodging provision by way of said traditional automated reservation system.

5. The method of claim 4 wherein a third-party speculator may enter into a plurality of contracts via said legal contract generator in order to acquire lodging inventory in advance of an expected event located at a predetermined location.

6. The method of claim 5 wherein a plurality of third-party speculators may bid against one another to obtain the rights to newly created off-site inventory for either use by an end consumer or for reselling to other of said speculators.

7. A method for a user to make event reservations by using a tangible computer-readable storage medium having computer-executable instructions implemented by a computing system for formatting and storing event information indicative of pre-established crowd-drawing events wherein said event information is either provided by an external database or generated internally in response to pre-established crowd-drawing events, said method comprising:
    determining, at one or more remote servers, primary and/or secondary geo-fence perimeter bands corresponding to said pre-established crowd-drawing events;
    receiving, from a speculator electronic input device, at least one offer of legally controlling a peak occupancy demand band corresponding with said primary and/or secondary geo-fence perimeter bands around said pre-established crowd-drawing events;
    generating a legal contract generator which operates in response to said at least one offer of legally controlling a peak occupancy demand band and in response to an acceptance by a lodging site supervisor a contract for occupancy is generated by said legal contract generator corresponding to said pre-established crowd-drawing events;
    providing a portal to a plurality of parties wherein said portal provides the opportunity to speculate on off-site available inventory corresponding with a volume of legal contracts generated in response to said legal contract generator in order to provide for distribution of said off-site available inventory to potential patrons or others desiring to speculate further; and
    wherein said user activates a browser associated with a first URL which is associated with said lodging reservation supervisor, and in turn, said user is redirected to a second URL associated with an online marketplace wherein said user is able to selectively filter marketplace listings by criteria such as but not limited to event, country, or date and wherein said user selects from said filtered criteria and then makes a bid on a specific listing reservation;
    wherein said lodging reservation supervisor ascertains if a room reservation is acceptable based on specific information received, and if the reservation is acceptable and if availability exists, said lodging reservation supervisor transmits acceptance of said reservation, said user's payment and contact credentials are presented to said lodging reservation supervisor to hold said reservation, said acceptance of said reservation is transmitted to said user, and said user's personal information, credit card and contact credentials are transmitted to said lodging reservation supervisor who in turn processes said payment and removes available room prices from public websites enabling participation of said user in said event reservations.

8. The method of claim 7 wherein said tangible computer readable storage medium is located remote from a newly created off-site inventory speculator storage device.

9. The method of claim 8 wherein said speculator storage device is a computer including a display for indicating to a speculator a status indicative of whether said legal contract has been accepted by said lodging reservation supervisor.

10. The method of claim 7 wherein said lodging reservation supervisor is associated with a traditional lodging site with its own third-party automated reservation system and wherein said third-party automated reservation system interfaces with said legal contract generator to remove from inventory availability of a lodging provision by way of said third-party automated reservation system.

11. The method of claim 10 wherein a third-party speculator may enter into a plurality of contracts via said legal contract generator in order to acquire lodging inventory in advance of an expected event located at a predetermined location.

12. The method of claim 11 wherein a plurality of third-party speculators may bid against one another to obtain rights to said off-site available inventory for either use by an end consumer or for reselling to other of said speculators.

* * * * *